(12) United States Patent
Hsieh et al.

(10) Patent No.: US 8,369,587 B2
(45) Date of Patent: Feb. 5, 2013

(54) DIGITAL SIGNATURE SYSTEM AND METHOD THEREOF

(75) Inventors: Kuan-Hong Hsieh, Taipei Hsien (TW); Lu Pan, Shenzhen (CN)

(73) Assignees: Hong Fu Jin Precision Industry (ShenZhen) Co., Ltd., Shenzhen (CN); Hon Hai Precision Industry Co., Ltd., New Taipei (TW)

( * ) Notice: Subject to any disclaimer, the term of this patent is extended or adjusted under 35 U.S.C. 154(b) by 279 days.

(21) Appl. No.: 12/859,280

(22) Filed: Aug. 19, 2010

(65) Prior Publication Data

US 2011/0158485 A1    Jun. 30, 2011

(30) Foreign Application Priority Data

Dec. 25, 2009  (CN) .......................... 2009 1 0312316

(51) Int. Cl.
*G06K 9/00*    (2006.01)
(52) U.S. Cl. ........................ 382/119; 382/186
(58) Field of Classification Search .................. 382/186, 382/119
See application file for complete search history.

(56) References Cited

U.S. PATENT DOCUMENTS

| | | | | |
|---|---|---|---|---|
| 4,701,960 A | * | 10/1987 | Scott | 382/122 |
| 5,195,133 A | * | 3/1993 | Kapp et al. | 705/75 |
| 5,553,156 A | * | 9/1996 | Obata et al. | 382/119 |
| 7,646,941 B2 | * | 1/2010 | Danielson et al. | 382/313 |
| 2003/0182585 A1 | * | 9/2003 | Murase et al. | 713/202 |
| 2005/0289008 A1 | * | 12/2005 | Olivier et al. | 705/22 |
| 2009/0228300 A1 | * | 9/2009 | Hamel et al. | 705/2 |

FOREIGN PATENT DOCUMENTS

| | | |
|---|---|---|
| CN | 1452105 A | 10/2003 |
| CN | 101237637 A | 8/2008 |
| CN | 201270021 Y | 7/2009 |

* cited by examiner

*Primary Examiner* — Samir Ahmed
*Assistant Examiner* — Totam Le
(74) *Attorney, Agent, or Firm* — Altis Law Group, Inc.

(57) ABSTRACT

A digital signature system includes an Electronic Data Interchange (EDI) server and a portable terminal communicating with the EDI server. The portable terminal includes a touch-sensitive display, and a processing unit includes a receiving module configured for receiving a file from the EDI server, a signature mode control module configured for providing a signature file mode for users to select, a signature file creating module configured for recording signature input through the touch-sensitive display and creating a signature file to record the input signature if the signature file mode is selected, and a file combining module configured for combining the signature file and the file from the EDI server into a composite signature file. A related method is also provided.

8 Claims, 4 Drawing Sheets

DIGITAL SIGNATURE SYSTEM AND METHOD THEREOF

BACKGROUND

1. Technical Field

The present disclosure relates to electronic management platforms and, particularly, to a digital signature system and a method thereof.

2. Description of the Related Art

Today, document signatures are needed in many occasions, such as in enterprise operations. Conventional document signature methods involve manual writing which wastes manpower and time. In order to solve the problems, an electronic signature system is needed. However, conventional electronic signature system cannot record signers' signatures, which may be inconvenient when a signature is needed.

BRIEF DESCRIPTION OF THE DRAWINGS

The components in the drawings are not necessarily drawn to scale, the emphasis instead being placed upon clearly illustrating the principles of a digital signature system and a method thereof. Moreover, in the drawings, like reference numerals designate corresponding parts throughout the several views.

DETAILED DESCRIPTION

Figure 1:
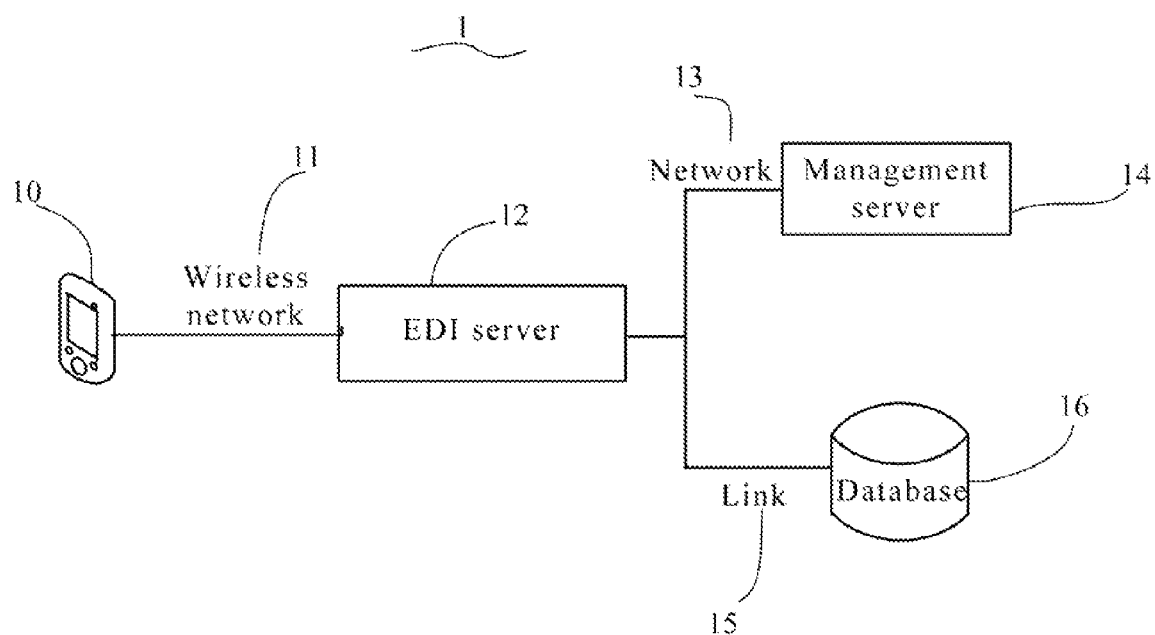
FIG. 1 is a hardware diagram of a digital signature system in accordance with an exemplary embodiment.

Referring to FIG. 1, a digital signature system 1 includes a portable terminal 10, an Electronic Data Interchange (EDI) server 12, a management server 14, and a database 16. The management server 14 is configured for storing files. The EDI server 12 is configured to obtain a file from the management server 14 and transmits the file to the portable terminal 10 according to a request from the portable terminal 10. The portable terminal 10 is connected to the EDI server 12 through a wireless network 11, the EDI server 12 is connected to the management server 14 through a network 13, and the database 16 is connected to the EDI server 12 through a link 15. In the embodiment, the wireless network 11 is Wireless Local Area Networks (WLAN), WIFI, or the like. The network 13 is a intranet, the Internet or the like. The link 15 is a database link, such as Java Database Connectivity (JDBC).

Figure 2:
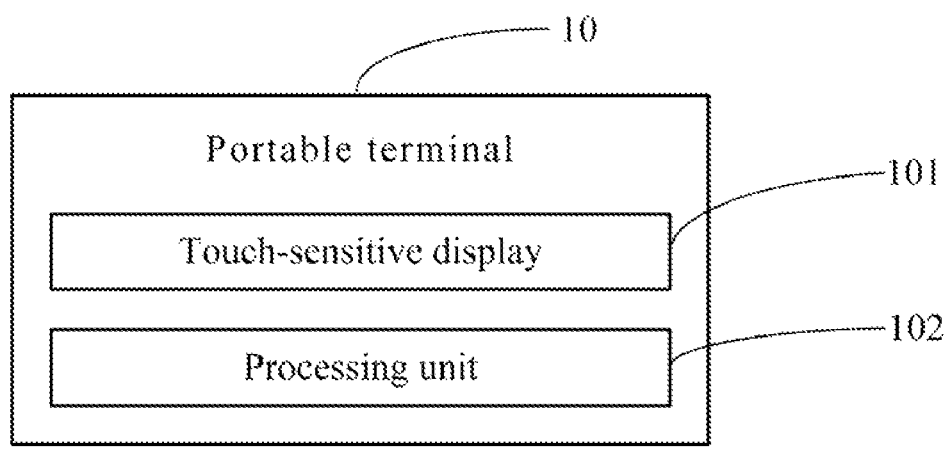
FIG. 2 is a block diagram of a portable terminal of the digital signature system of FIG. 1.

Referring also to FIG. 2, the portable terminal 10 includes a touch-sensitive display 101, and a processing unit 102. In this embodiment, the display 101 can be an Electrophoretic display or a Liquid Crystal Display (LCD) display.

Figure 3:
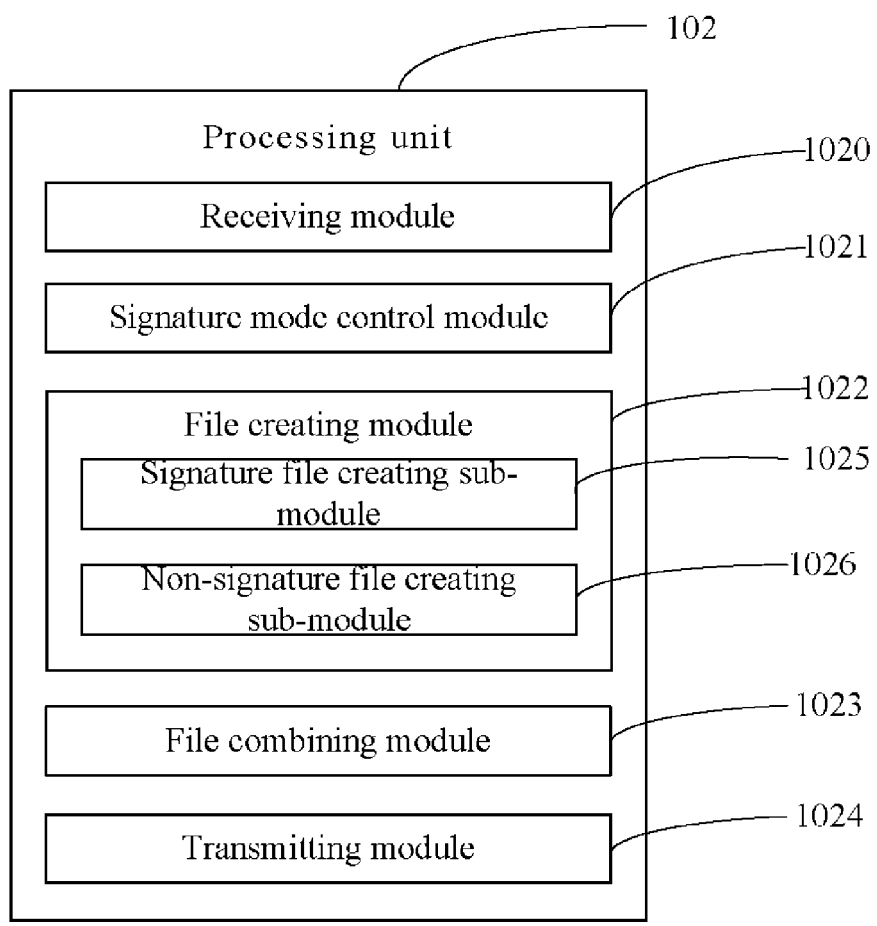
FIG. 3 is a block diagram of a processing unit of the portable terminal of FIG. 2.

Referring also to FIG. 3, the processing unit 102 includes a receiving module 1020, a signature mode control module 1021, a file creating module 1022, a file combining module 1023, and a transmitting module 1024. The receiving module 1020 is configured for receiving a file from the EDI server 12. In the present embodiment, the portable terminal 10 provides a user interface on the touch-sensitive display 101 for the users to enter requests for the file and forwards the requests to the EDI server 12 through the wireless network 11. The EDI server 12 transmits the file to the portable terminal 10 according to the requests. The signature mode control module 1021 is configured to provide a signature file mode and a non-signature file mode for users to select.

The file creating module 1022 is configured to provide a user interface on the touch-sensitive display 101 for the users to input signature, and includes a signature file creating sub-module 1025 and a non-signature file creating sub-module 1026. If the signature file mode is selected, the signature file creating sub-module 1025 creates a signature file to record the input signature. If the non-signature file mode is selected, the non-signature file creating sub-module 1026 recognizes the input signature, converts the input signature to recognizable characters of the portable terminal 10, and creates a non-signature file to record the characters.

The file combining module 1023 is configured to combine the signature file and the file from the EDI server 12 to a composite signature file, or combine the non-signature file and the file from the EDI server 12 to a composite non-signature file. The transmitting module 1024 is configured to transmit the composite signature file or the composite non-signature file to the EDI server 12 through the wireless network 11. The EDI server 12 stores the composite signature file or the composite non-signature file in the database through the link 15. In another embodiment, the file combining module 1023 is included in the EDI server 12. The file combining module 1023 is configured to combine the signature file from the portable terminal 10 and a file obtained from the management server 14 to a composite signature file, or combine the non-signature file from the portable terminal 10 and the file obtained from the management server 14 to a composite non-signature file.

Figure 4:
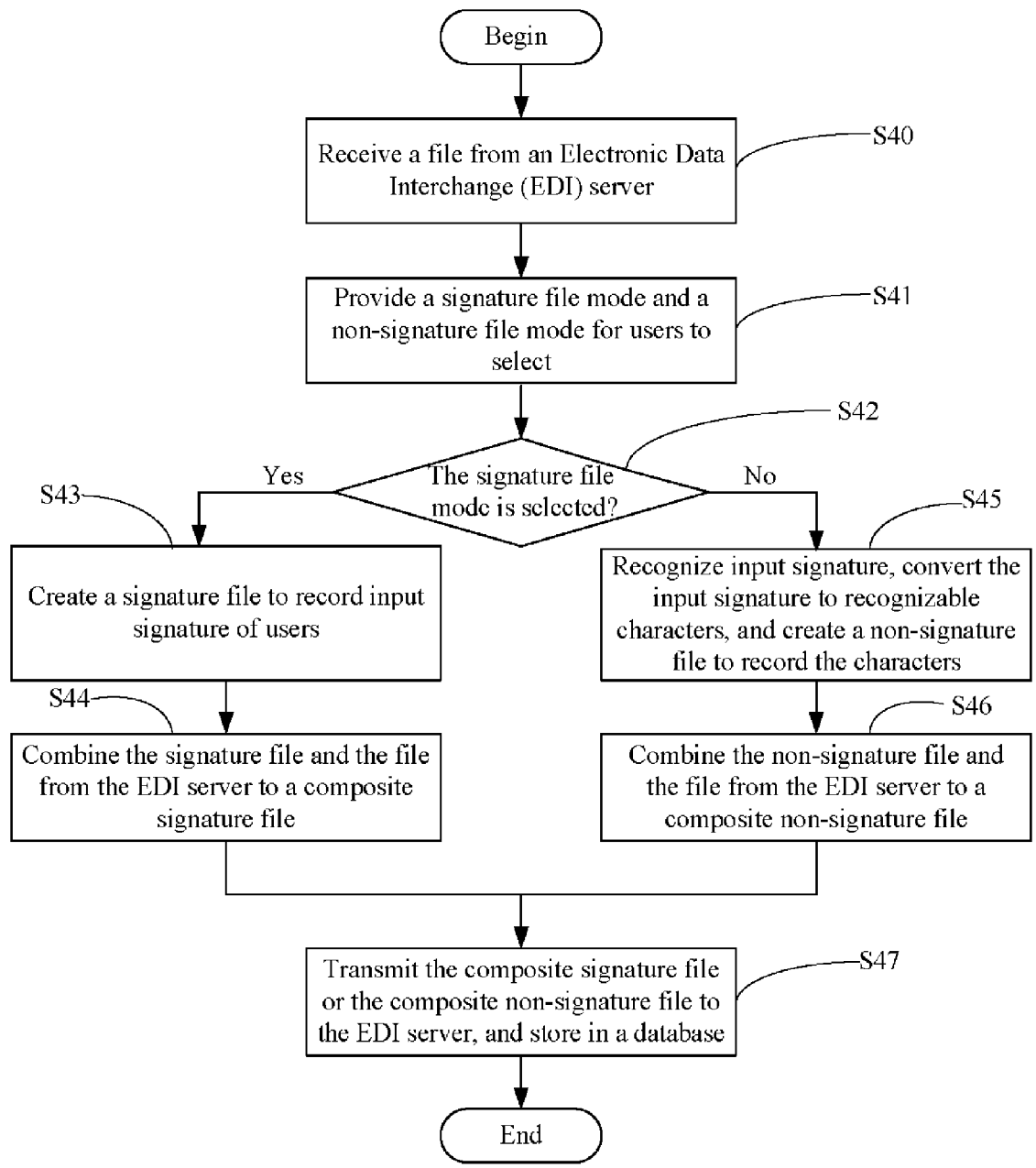
FIG. 4 is a flowchart of a digital signature method in accordance with an exemplary embodiment.

Referring to FIG. 4, a flowchart of a digital signature system method in accordance with an exemplary embodiment is illustrated.

In step S40, the receiving module 1020 receives a file from the EDI server 12, according to requests of users of the portable terminal 10. In the present embodiment, the portable terminal 10 provides a user interface on the touch-sensitive display 101 for the users to enter the requests and forwards the requests to the EDI server 12 through the wireless network 11. The EDI server 12 transmits the file to the portable terminal 10 according to the requests.

In step S41, the signature mode control module 1021 provides a signature file mode and a non-signature file mode for the users to select.

In step S42, the signature mode control module 1021 determines whether the signature file mode or the non-signature file mode is selected. If the signature file mode is selected, the procedure goes to step S43, otherwise the procedure goes to step S45.

In step 43, the signature file creating sub-module 1025 and creates a signature file to record input signature of the users which is input through a user interface displayed on the touch-sensitive display 101.

In step 44, the file combining module 1023 combines the signature file and the file from the EDI server 12 to a composite signature file, the procedure goes to step S47.

In step 45, the non-signature file creating sub-module 1026 recognizes input signature of the users which is input through a user interface displayed on the touch-sensitive display 101, converts the input signature to recognizable characters of the portable terminal 10, and creates a non-signature file recording the characters.

In step 46, the file combining module 1023 combines the non-signature file and the file from the EDI server 12 to a composite non-signature file In step 47, the transmitting module 1024 transmits the composite signature file or the non-signature file to the EDI server 112 through the wireless network 11, and the EDI server 112 stores the composite signature file or the non-signature file in the database 16 through the link 15.

In another embodiment, the transmitting module 1024 transmits the signature file or the non-signature file to the EDI server 12 through the wireless network 11. The file combining module 1023 combines the signature file and the file from the management server 14 to a composite signature file, or combines the non-signature file and the file from the management server 14 to a composite non-signature file. The composite signature file or the composite non-signature file is stored in the database 16 by the link 15.

It is understood that the present disclosure may be embodied in other forms without departing from the spirit thereof. Thus, the present examples and embodiments are to be considered in all respects as illustrative and not restrictive, and the disclosure is not to be limited to the details given herein.

What is claimed is:

1. A digital signature system, comprising:
an Electronic Data Interchange (EDI) server; and
a portable terminal communicating with the EDI server, comprising:
a touch-sensitive display; and
a processing unit, comprising:
a receiving module configured for receiving a file from the EDI server;
a signature mode control module configured for providing a signature file mode and a non-signature file mode for users to selected;
a signature file creating module configured for signature input through the touch-sensitive display and creating a signature file to record the input signature if the signature file mode is selected;
a non-signature file creating module configured for recognizing signature input through the touch-sensitive display, converting the input signature to recognizable characters, and creating a non-signature file to record the characters if the non-signature file mode is selected; and
a file combining module configured for combining the signature file and the file from the EDI server to a composite signature file, and combining the non-signature file and the file from the EDI server to a composite non-signature file.

2. The system as recited in claim 1, wherein the processing unit further comprises a transmitting module configured for transmitting the composite signature file or the composite non-signature file to the EDI server.

3. The system as recited in claim 2, further comprising a database, wherein the EDI server is configured for storing the composite signature file or the composite non-signature file to the database.

4. The system as recited in claim 1, further comprising a management server for storing files, wherein the EDI server is configured for obtaining the file from the management server.

5. A portable terminal communicating with an Electronic Data Interchange (EDI) server, the portable terminal comprising:
a touch-sensitive display; and
a processing unit, comprising:
a receiving module configured for receiving a file from the EDI server;
a signature mode control module configured for providing a signature file mode and a non-signature file mode for users to selected;
a signature file creating module configured for signature input through the touch-sensitive display and creating a signature file to record the input signature if the signature file mode is selected;
a non-signature file creating module configured for recognizing signature input through the touch-sensitive display, converting the input signature to recognizable characters, and creating a non-signature file to record the characters if the non-signature file mode is selected; and
a file combining module configured for combining the signature file and the file from the EDI server to a composite signature file, and combining the non-signature file and the file from the EDI server to a composite non-signature file.

6. The system as recited in claim 5, wherein the processing unit further comprises a transmitting module configured for transmitting the composite signature file or the composite non-signature file to the EDI server.

7. An electronic signature method comprising:
receiving a file from an Electronic Data Interchange (EDI) server in response to requests of users of a portable terminal;
providing a signature file mode and a non-signature file mode on the portable terminal for users to select;
determining whether the signature file mode or the non-signature file mode is selected according to the users' selections;
creating a signature file to record input signature of users which is input through a user interface displayed on the portable terminal if the signature file mode is selected; or recognizing the input signature of users, converting the input signature to recognizable characters, and creating a non-signature file to record the characters if the non-signature file mode is selected; and
combining the signature file and the file from the EDI server to a composite signature file or the non-signature file and the file from the EDI server to a composite non-signature file.

8. The method as recited in claim 7, further comprising: sending the signature file or the non-signature file to the EDI server.

\* \* \* \* \*